United States Patent
van Eggelen et al.

(10) Patent No.: US 10,362,264 B2
(45) Date of Patent: *Jul. 23, 2019

(54) PROFILE FOR FRAME RATE CONVERSION

(71) Applicant: Entropic Communication, LLC, Carlsbad, CA (US)

(72) Inventors: Edwin van Eggelen, Berlieum (NL); Jeroen de Kleijn, Eindhoven (NL); Marco Bosma, Hardenberg (NL)

(73) Assignee: Entropic Communications, LLC, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/105,488

(22) Filed: Aug. 20, 2018

(65) Prior Publication Data

US 2018/0376102 A1 Dec. 27, 2018

Related U.S. Application Data

(63) Continuation of application No. 13/121,347, filed as application No. PCT/IB2009/054269 on Sep. 30, 2009, now Pat. No. 10,075,670.

(30) Foreign Application Priority Data

Sep. 30, 2008 (EP) ..................... 08165519

(51) Int. Cl.
*H04N 7/01* (2006.01)
*H04N 19/172* (2014.01)
(Continued)

(52) U.S. Cl.
CPC ............. *H04N 7/01* (2013.01); *H04N 19/132* (2014.11); *H04N 19/156* (2014.11); *H04N 19/172* (2014.11)

(58) Field of Classification Search
CPC .... H04N 17/01; H04N 19/132; H04N 19/156; H04N 19/172
(Continued)

(56) References Cited

U.S. PATENT DOCUMENTS 4,496,995 A   1/1985 Colles et al.
5,852,473 A * 12/1998 Horne .................. H04N 7/0112
                                                     348/558
(Continued)

FOREIGN PATENT DOCUMENTS

WO   9952281      10/1999
WO   2005117445   12/2005
(Continued)

OTHER PUBLICATIONS

Int'l Search Report and Written Opinion Appln No. PCT/IB2009/054269 dated Jan. 11, 2010 (9 pgs.).

*Primary Examiner* — Michael Lee
(74) *Attorney, Agent, or Firm* — McAndrews, Held & Malloy, Ltd.

(57) ABSTRACT

The present application relates to a method for frame rate conversion. The present application relates also to a system for frame rate conversion and a computer comprising said frame rate. In addition, the present application relates to a computer readable medium having a computer program for performing said method. The method comprises defining a first frame rate profile with a first frame rate, defining at least a second frame rate profile with a second frame rate, rendering video frames at the first frame rate profile, detecting the quality of the rendered video frames, and switching from the first frame rate profile to the second frame rate profile at least depending on the detected quality of the rendered video frames.

19 Claims, 1 Drawing Sheet

(51) Int. Cl.
*H04N 19/132* (2014.01)
*H04N 19/156* (2014.01)

(58) Field of Classification Search
USPC ........................................................ 348/441
See application file for complete search history.

(56) References Cited

U.S. PATENT DOCUMENTS

| | | | |
|---|---|---|---|
| 5,986,709 A | 11/1999 | Lee | |
| 6,567,117 B1 | 5/2003 | Nago et al. | |
| 6,850,567 B1 | 2/2005 | Pejhan et al. | |
| 7,003,154 B1 | 2/2006 | Peker et al. | |
| 7,411,617 B2 | 8/2008 | Kume et al. | |
| 7,826,710 B2 | 11/2010 | Itani | |
| 10,075,670 B2 * | 9/2018 | van Eggelen | H04N 7/01 |
| 2002/0146071 A1 * | 10/2002 | Liu | H04N 5/147 |
| | | | 375/240.16 |
| 2004/0236807 A1 | 11/2004 | Hsiung et al. | |
| 2005/0078101 A1 | 4/2005 | Shigeta | |
| 2005/0259740 A1 | 11/2005 | Kobayashi et al. | |
| 2006/0115165 A1 | 6/2006 | Chao et al. | |
| 2006/0171665 A1 | 8/2006 | Itani | |
| 2006/0262651 A1 | 11/2006 | Cooper et al. | |
| 2007/0024706 A1 | 2/2007 | Brannon et al. | |
| 2007/0067480 A1 | 3/2007 | Beek et al. | |
| 2007/0147517 A1 | 6/2007 | Hu | |
| 2007/0242080 A1 * | 10/2007 | Hamada | G09G 5/006 |
| | | | 345/606 |
| 2007/0273787 A1 | 11/2007 | Ogino et al. | |
| 2007/0296811 A1 * | 12/2007 | Miyazaki | H04N 7/0115 |
| | | | 348/97 |
| 2008/0055318 A1 | 3/2008 | Glen | |
| 2008/0231745 A1 | 9/2008 | Ogino et al. | |
| 2008/0284908 A1 * | 11/2008 | Chang | H04N 7/014 |
| | | | 348/452 |
| 2010/0020232 A1 * | 1/2010 | Mori | G09G 3/20 |
| | | | 348/452 |
| 2011/0013881 A1 | 1/2011 | Itani | |

FOREIGN PATENT DOCUMENTS

| | | | |
|---|---|---|---|
| WO | 2007129257 | 11/2007 | |
| WO | WO-2008035475 A1 * | 3/2008 | G09G 3/20 |

* cited by examiner

PROFILE FOR FRAME RATE CONVERSION

PRIORITY INFORMATION

This patent application is a continuation of U.S. application Ser. No. 13/121,347 filed Jun. 9, 2011, which claims priority from PCT patent application PCT/IB2009/054269 filed Sep. 30, 2009, which claims priority to EP patent application 08165519.3 filed Sep. 30, 2008, both of which are hereby incorporated by reference.

TECHNICAL FIELD

The present application relates to a method for frame rate conversion. The present application relates also to a system for frame rate conversion and a computer comprising said system. In addition, the present application relates to a computer readable medium having a computer program for performing said method.

BACKGROUND OF THE INVENTION

Nowadays, multimedia devices comprising programmable platform are widely used as play back devices. In particular, these computers can be equipped with powerful Graphic Processing Units (GPUs) and/or Central Processing Units (CPUs) that are able to perform advanced video processing algorithms. In this technology field, it is an ongoing concern to improve the video playback quality.

For improving video playback quality, software solutions can be employed. In present times, a plurality of different computers, comprising different amounts of resources available to perform video processing, is provided. In addition, on each computer or platform, the amount of available resources may also vary depending on running background applications, operating system, complexity of the video stream, video playback application, video renderer, screen resolution and the like. Consequently, the amount of available resources will also vary over time. For these reasons, it is difficult to determine the most suitable algorithm for processing a video stream. Testing each model in each possible configuration and setting is practically impossible for a broad launch.

More particularly, issues occur if the amount of resources is too low at a certain moment in time, since the video renderer may receive the video frames too late or it may not be able to display the received frames at the desired output rate. This may cause that the renderer may stall and severe hiccups may occur in the rendered video.

According to prior art, it may be possible to set the processing to a lower quality such that the previously mentioned problems are less likely to occur. However, this is not the preferred scenario as it is not possible to adapt to varying conditions in this way. By way of example, it may be required to lower the quality more than strictly necessary to prevent problems due to these varying conditions. Furthermore, also lowering the quality may not ensure that these problems will never arise. As a consequence, the quality will not be optimal, while the problems mentioned might still occur.

Furthermore, according to prior art, frame rate conversion can be used to adapt the frame rate. When frame rate conversion video processing algorithms are to be used, a user has to decide if the computer is powerful enough to run the respective algorithm. With off-line processing, the amount of resources the frame rate conversion algorithm requires merely determines the time it takes to process a video clip. With real-time processing however, the amount of needed resources may not exceed the amount of available resources.

SUMMARY OF THE INVENTION

Therefore, it is one object of the present invention to provide a method for automatically adapting video processing algorithms. It is a further object to increase the video quality. Another object is to prevent visible artefacts which occur during a frame rate conversion.

These and other objects are solved by a method comprising defining a first frame rate profile with a first frame rate. The method comprises defining at least a second frame rate profile with a second frame rate. The method comprises rendering video frames at the first frame rate profile. The method comprises detecting the quality of the rendered video frames. The method comprises switching from the first frame rate profile to the second frame rate profile at least depending on the detected quality of the rendered video frames.

The present method can be used in any kind of video processing. In particular, this method can be implemented technology-independently on any kind of processing platform.

The first frame rate profile may be the default or start profile. Moreover, the first frame rate profile can be defined arbitrarily. For instance, the first frame rate profile may depend on the prerequisites of the used computer, like the performance of the computer, the installed applications and the like. It may be also possible to select a frame rate profile as the first frame rate profile, which represent a high frame rate profile or low one. Furthermore, a second profile may be defined providing at least a different quality. Both profiles may differ in their frame rate.

Video frames can be received for instance from a suitable video source and rendered at the first frame rate profile. In other words, video frames are processed by a suitable video renderer at a first frame rate for displaying the video stream.

Contrary to expectations, it is found according to the present application that an optimal video quality can be ensured by detecting, in particular automatically detecting, the most suitable kind of frame rate conversion, which can be performed with the available resources on the respective computer. More particularly, the quality of the rendered video frames can be detected, wherein detecting the quality of the rendered video frames may include detecting information about rendered and/or dropped video frames. Depending on this detection the frame rate profile can be switched. This includes increasing, reducing or remaining the actual frame rate or frame rate profile. Since the available resources of the computer may vary over time, for instance, other applications require or do no more require resources, the quality may deviate over time. The present application ensures that the highest available quality can be always achieved. In particular, the present method provides for an automatic adaptation of the frame rate to varying requirements over time without any user interaction. The present application may be particular suitable for a broad range of hardware with different processing capabilities.

In another embodiment according to the present application at least a third frame rate profile with a third frame rate can be defined. It may be also possible to define more frame rate profiles for providing a respective number of different video qualities. A more accurate quality adaptation can be achieved.

In general, the first frame rate profile acting as the default frame rate can be defined arbitrarily. The default profile can be stored for a certain platform, for instance for a low-end platform that can rarely run the high profile a low profile may be chosen as the default profile. According to a further embodiment, the first frame rate profile can be defined such that the first frame rate first frame rate is the frame rate giving the highest video quality, such as the best possible frame rate. In addition, according to another embodiment, the second frame rate profile can be defined such that the second frame rate is lower than the first frame rate. In other words, video processing can be started with the highest available quality and in case it is detected that the actual video quality is inadequate, the quality can be dropped to a lower profile by switching from the first frame rate profile to the second frame rate profile.

According to a further embodiment, a high frame rate can be generated by adding pull-down and/or motion compensated interpolation. Pull-down includes repeating input frames. Furthermore, according to another embodiment, the third frame rate profile may be defined such that the third frame rate comprises added pull-downs. In general, motion compensated interpolation may provide higher quality as well as it may require a larger amount of resources.

Furthermore, detecting the quality of the rendered video frames may comprise, according to another embodiment of the present application, sending information about the quality of the rendered video frames from a video renderer to a frame rate converter and/or requesting information about the quality of the rendered video frames by the frame rate converter from a video renderer. It may be advantageous if both possibilities are provided to obtain a flexible and fail-proof system.

According to another embodiment, the method may comprise defining at least one quality range for at least one quality parameter, and detecting at least whether the detected quality of the rendered video frames is beyond the defined quality range. A quality parameter, like the time accuracy of video frames received by the video renderer can be used as a quality indicator. More particularly, it can be checked whether a video frames are received too early or too late. The thresholds of the quality range can be predefined depending on user wishes or system requirements. It shall be understood, that further parameters corresponding to possible problems of displaying video frames can be taken into account alternatively and/or additionally. An inadequate video quality can be detected in a simple way while the sensibility can be predefined by respective defined quality ranges. It shall be understood that the quality range can be also defined in such a way that a detected quality, which is within the quality range, causes to switch the frame rate or frame rate algorithm.

For avoiding visible artifacts generated by switching the frame rate profile and frame rate respectively, the present method may comprise defining a motion range. The method may comprise detecting the actual motion within the video frames. In addition, the method may comprise switching from the first frame rate profile to the second frame rate profile in case the detected motion is beyond the defined motion range. In other words, switching between a first profile and a second profile can be delayed until a suitable time point. The threshold defining the motion range can be established depending on system requirements or the like. Examples of moments where it can be switched on are scene changes, scenes with little or no motion, and very complex scenes without large objects moving with a more or less constant speed. This may be of particular advantage in case it is switched from a low profile to a high profile. It shall be understood that according to other variants of the present application direct switching may be also possible, in particular if a problem with rendering is detected. It shall be understood that the motion range can be also defined in such a way that a detected motion, which is within the motion range, causes to switch the frame rate or frame rate algorithm.

According to a further embodiment, the actual motion within the video frames can be detected by detecting the motion vectors of the input video frames of the video renderer. Detecting and analyzing the motion vectors can be performed in a simple manner. These motion vectors may indicate whether a frame comprises little consistent motion. Then, switching can be performed without or at least with reduced visible artefacts.

In general the quality of the video frames can be detected at arbitrarily time points and/or arbitrarily video frames can be detected, for instance, every second video frame. By way of example, the quality of the video frames can be detected periodically. For achieving especially accurate detecting results, according to a further embodiment of the present application, detecting the quality of the rendered video frames may comprise detecting the quality of every video frame. Since every video frame can be analyzed, the quality or frame rate can be directly adapted in occurrence of a detected problem.

Another aspect of the present application is a system comprising at least one video source. The system comprises at least one video processing filter, like a frame rate converter. The system comprises at least one video renderer, wherein the video renderer is configured to render video frames at a first frame rate profile. The system comprises a detector configured to detect the quality of the rendered video frames, wherein the frame rate converter is configured to switch from the first frame rate profile to a second frame rate profile depending on the detected quality of the rendered video frames.

A video source may be any suitable video stream generator, like a streaming video filter, a combination of a file reader, a video/audio demultiplexer and video decompressor or the like. The video processing filter, frame rate converter or frame rate conversion filter may also include a de-interlacer as well as two or more filters. The video renderer may be a device configured to display the received video stream at the respective frame rate while the detector may be suitable for detecting the desired quality of the rendered video frames.

Contrary to expectations, it is found that the video processing algorithm can be automatically adapted to give the highest possible quality if the frame rate converter is configured to switch from the first frame rate profile to a second frame rate profile depending on the detected quality of the rendered video frames.

According to another embodiment of the present application, the system may comprise an analyzer configured to analyze the detected quality of the rendered video frames. For instance, the analyzer is configured to check whether predefined quality requirements are fulfilled by the detected quality of the rendered video frames. The requirements can be defined by quality ranges as previously mentioned. The analyzer may be any suitable processing device and can be implemented within the frame rate converter, within the detector, within the video renderer or as an additional component being in connection with the frame rate converter, the detector or the video renderer.

Another aspect of the present application is a computer comprising the above-mentioned system.

Another aspect of the present application is a computer readable medium having a computer program stored thereon. The computer program comprises instructions operable to cause a processor to perform the above-mentioned method.

These and other aspects of the present patent application become apparent from and will be elucidated with reference to the following Figures. The features of the present application and of its exemplary embodiments as presented above are understood to be disclosed also in all possible combinations with each other.

BRIEF DESCRIPTION OF THE DRAWINGS

In the Figures show.

Like reference numerals in different Figures indicate like elements.

DETAILED DESCRIPTION OF THE DRAWINGS

In the following detailed description of the present application, exemplary embodiments of the present application will describe and point out a system and a method for automatically adapting the video processing algorithm to ensure an optimal video quality.

Figure 1:
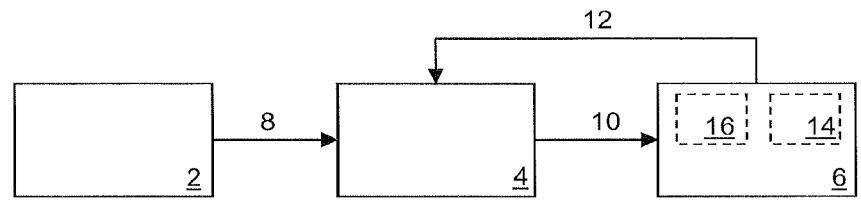
FIG. 1 an embodiment of a system according to the present application,
FIG. 2 a flowchart of a first embodiment of the method according to the present application,
FIG. 3 a flowchart of a second embodiment of the method according to the present application.

FIG. 1 shows a first simplified embodiment of a system according to the present application. The shown system may be a video processing chain embedded in a computer or the like. The present system comprises a video source 2, a frame rate converter 4 and a video renderer 6. The video source 2 may be a streaming video filter, a combination of a file reader, a video/audio demultiplexer and video decompressor or the like. Such a component may be configured to generate a video stream or video frames with a frame rate $F_{src}$.

This signal may be transmitted from the video source 2 to the frame rate converter 4 via link 8. The frame rate converter 4 is provided for changing the frame rate of the video frames to another frame rate $F_{dst}$. It shall be understood that the frame rate can be also remained unchanged. It shall be further understood that, according to further variants of the present application, the frame rate conversion filter 4 may comprise other processing as well as more frame rate conversion filters can be provided within the video processing system.

The resulting output signal can be fed from the frame rate converter 4 to the video renderer 6 via link 10. The video renderer 6 is configured to display the received video stream at the respective frame rate. Additionally, the video renderer 6 may be configured to synchronize the video stream with an audio stream. According to the present embodiment, the video renderer 6 comprises a detector 14 for detecting the quality of the rendered video frames. It shall be understood that the detector 14 can be also arranged beyond the video renderer 6 comprising merely a connection to the video renderer 6.

Furthermore, in the present embodiment, the video renderer 6 may comprise an analyzer 16 for analyzing the quality of the rendered video frames detected by the detector 14. A detailed elucidation will follow subsequently.

As can be seen from this Figure, a further connection 12 is provided between both the frame rate converter 4 and the video renderer 6. This connection 12 is used to provide information about the quality of the rendered video frames to the frame rate converter 4. For instance, the video renderer 6 can send messages, in particular quality messages to the connected frame rate converter 4 or the frame rate converter 4 can request this information from the video renderer 6. The quality messages may comprise quality information, like information about receiving frames too late or too early and about problems with displaying the frames detected by the detector 14. It shall be understood that in case more frame rate conversion filters are provided in the video system, each filter can be connected to the video renderer.

Figure 2:
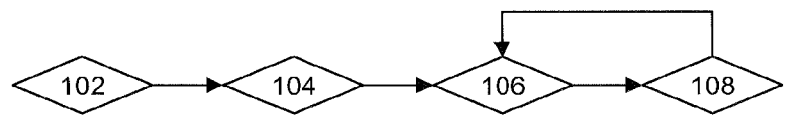

In the following, a first embodiment of the method according to the present application will be elucidated by the aid of FIGS. 1 and 2. FIG. 2 shows a simplified flowchart of a first embodiment of the method according to the present application.

In a first step 102, at least a first frame rate profile and a second frame rate profile can be defined which differ in their respective frame rates. Defining these first frame rates can be performed during producing the video system or computer. It shall be understood that three or more profiles can be defined and stored for enabling adapting the video quality to a plurality of different quality levels depending on the actually available resources of the computer.

In general, the profiles may represent different quality standards which can be executed by the video processing system. Thereby, a high standard comprising a high frame rate may require more resources than a lower standard. Thus, it may be possible that the available resources are sufficient for performing the video process with merely the lower video processing algorithm. However, the available resources may vary over time, and hence, the possibly optimal quality may vary over time as well.

In a next step 104, the video renderer 6 renders the video frames at a default frame rate, like the first frame rate. The quality of the rendered video frames is detected in a next step 106. In particular, the quality is detected by the detector 14 and can be analyzed by the analyzer 16. It may be advantageous to detect the quality of every video frame. It shall be understood that according to other variants the quality of a less number of video frames can be examined resulting in less processing effort. By way of example, a quality range of a quality parameter can be defined. For instance, it can be checked whether the video frames are received in a predefined time interval, i.e. in due time. In case the frames are received too early or too late, the quality may be inadequate. Further parameters corresponding to the video quality can be alternatively or additionally taken into account. The analyzer 16 may comprise suitable processing and storing means. It may be also possible that such a processing device is interconnected between the frame rate converter 4 and the video renderer 6 or comprised by the video renderer 6, for instance implemented within the detector 14. Then the video renderer 6 can send quality messages to the connected frame rate converter 4 or the frame rate converter 4 can request this information from the video renderer 4 via link 12.

In a next step 108, the frame rate converter 4 may convert the actual frame rate, like the first frame rate, to another frame rate, like the second frame rate in dependence of the detected quality. This includes that the frame rate can be also maintained. In case the detected quality of the rendered video frame is below the quality threshold the frame rate converter 4 may drop the quality by switching from a high frame rate profile to a low frame rate profile.

Checking the quality includes also that in case the quality is low but stable the frame rate converter 4 can switch from a low frame rate profile to a high frame rate profile. For instance, in case the quality is previously switched to a low profile and the quality of the rendered video frames is stable during a predefined time period, the actual profile can be refreshed to the high profile after the predefined time period.

After step 108, video processing can be continued with step 106 until video processing is terminated.

Figure 3:
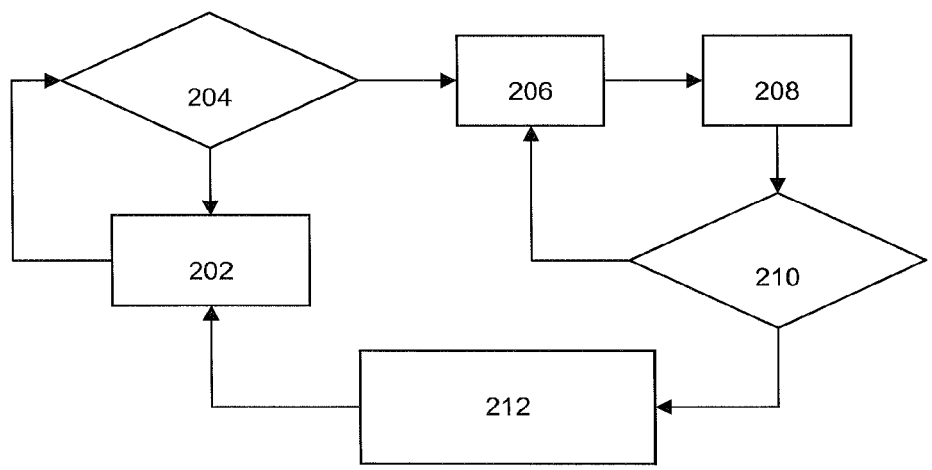

In FIG. 3, a further flowchart of a second embodiment of the method according to the present application is shown.

As stated above, processing can be started in step 202 at any profile. In the following example, it is assumed that the first frame rate profile acting as the default profile is the high frame rate profile.

Starting from the high profile, for every video frame the rendering can be checked (step 204). If the frames can be displayed at this rate without problems, the frame rate conversion filter stays in the high profile mode. If there are problems rendering the video stream, like the actual frame rate is not achievable due to limited available resources, the quality is dropped to a second defined frame rate profile, like the low profile (step 206). As mentioned above, checking the quality can be performed by using one or more quality threshold of parameters representing the video quality and the frame rate converter may switch from the high frame rate profile to a low frame rate profile.

The switching from the high frame rate profile to the low frame rate profile may need some additional filtering to avoid unnecessary switching. However, it can react on the detected problems as quick as possible. It can react very fast since the quality can be detected by checking every video frame.

In the low profile (step 206), the output frame rate is normally lower than the display rate. Therefore, the video renderer 6 may add implicitly pull-downs to the video stream. After a predefined time period in the low profile, it can be switched to a third profile (step 208), like switching the quality to a medium profile, wherein the quality of the medium profile is lower than the high profile. For instance, after the predefined time period additional resources may be provided since other applications do not require these resources any more.

In this profile (step 208), it may be possible to perform motion estimation. However, motion estimation may not include the actual motion compensated frame interpolation. The output frame rate can be achieved by adding pull-down to the video stream.

Then, in a next step 210, the quality of the rendered video frames can be detected and checked. In case problems are detected it can be switched back to the low frame rate profile (step 206). If there are no issues rendering at this third rate, the frame rate conversion filter can be switched back to the first frame rate profile, i.e. the high profile.

To prevent visible switching artifacts, switching can be delayed until a suitable time point (step 212). More particularly, for determining a suitable time point the motion, in particular the motion vectors of the input video stream, can be analyzed in step 212. A motion range comprising two motion thresholds defining an upper bound and a lower bound of the motion range can be predefined. This motion range can define the motion range, in which visible switching artifacts may occur, while beyond the predefined motion range switching artifacts may not be visible or at least to a significantly reduced extent.

In case the actual detected motion is below the lower bound or above the upper bound, the frame rate conversion filter can be switched to the high profile (202). Examples of moments where frame rate conversion can be switched on are scene changes, scenes with little or no motion, and very complex scenes without large objects moving with a more or less constant speed.

It shall be understood that, according to further variants of the present application, more frame rate profiles can be provided as well as merely one profile can be provided. Furthermore, it shall be understood that every switching step can be performed by taking the motion of the video stream into account. Moreover, the term frame rate converter includes also a de-interlacer. In this case the output frame rate may for instance be dropped to half the number of input fields per second when problems occur in the video renderer.

Furthermore, it is readily clear for a person skilled in the art that the logical blocks in the schematic block diagrams as well as the flowchart and algorithm steps presented in the above description may at least partially be implemented in electronic hardware and/or computer software, wherein it depends on the functionality of the logical block, flowchart step and algorithm step and on design constraints imposed on the respective devices to which degree a logical block, a flowchart step or algorithm step is implemented in hardware or software. The presented logical blocks, flowchart steps and algorithm steps may for instance be implemented in one or more digital signal processors, application specific integrated circuits, field programmable gate arrays or other programmable devices. The computer software may be stored in a variety of storage media of electric, magnetic, electro-magnetic or optic type and may be read and executed by a processor, such as for instance a microprocessor. To this end, the processor and the storage medium may be coupled to interchange information, or the storage medium may be included in the processor.

What is claimed is:

1. A method, comprising:
   detecting one or more dropped video frames in a plurality of video frames of a video stream rendered according to a first frame rate;
   estimating a quality of the plurality of rendered video frames according to information about the one or more dropped video frames;
   determining to switch to a second frame rate according to the estimated quality of the plurality of rendered video frames, wherein the second frame rate is achieved by inserting frames into the video stream;
   detecting motion in a video frame of the video stream subsequent to the plurality of video frames of the video stream; and
   switching to the second frame rate at a time determined by the motion detected in the subsequent video frame.

2. The method of claim 1, wherein the first frame rate produces a higher video quality than the second frame rate.

3. The method of claim 1, wherein the second frame rate is higher than the first frame rate.

4. The method of claim 1, wherein switching to the second frame rate comprises increasing the frame rate by adding a pull-down.

5. The method of claim 1, wherein switching to the second frame rate comprises increasing the frame rate by performing motion compensated interpolation.

6. The method of claim 1, wherein detecting motion in the video frame of the video stream comprises detecting motion beyond a defined motion range.

7. The method of claim 1, wherein a video renderer is operable to perform detecting the one or more dropped video frames.

8. The method of claim 1, wherein detecting motion comprises monitoring a plurality of motion vectors.

9. The method of claim 1, wherein a frame rate converter is operable to perform switching to the second frame rate.

10. A system, comprising:
a frame rate converter configured to switch from a first frame rate to a second frame rate according to a detected quality of a plurality of rendered video frames, wherein a timing of the switch is according to motion detected in a video frame subsequent to the plurality of rendered video frames, and wherein the second frame rate is achieved by inserting frames into the video stream, and wherein the quality of the plurality of rendered video frames is detected according to information about one or more dropped video frames.

11. The system of claim 10, wherein the first frame rate results in a higher video quality than the second frame rate.

12. The system of claim 10, wherein the second frame rate is higher than the first frame rate.

13. The system of claim 10, wherein the frame rate converter is configured to switch to the second frame rate by adding a pull-down.

14. The system of claim 10, wherein the frame rate converter is configured to switch to the second frame rate by performing motion compensated interpolation.

15. The system of claim 10, wherein the system comprises a video renderer configured to detect the motion in the video frame of the video stream, wherein the motion is beyond a defined motion range.

16. The system of claim 10, wherein the system comprises a video renderer configured to detect the quality according to one or more dropped video frames.

17. The system of claim 10, wherein the system comprises a video renderer configured to detect the motion by monitoring a plurality of motion vectors.

18. The system of claim 10, wherein the system comprises an analyzer configured to analyze the detected quality of the rendered video frames.

19. The system of claim 10, wherein the system comprises an error detector configured to detect the quality of the plurality of rendered video frames according to information about the one or more dropped video frames.

* * * * *